United States Patent [19]
Saito et al.

[11] Patent Number: 4,593,174
[45] Date of Patent: Jun. 3, 1986

[54] METHOD FOR WELDING VERY LOW CARBON STEEL

[75] Inventors: Shoji Saito; Nobutaka Yurioka; Shigeru Oshita, all of Sagamihara, Japan

[73] Assignee: Nippon Steel Corporation, Tokyo, Japan

[21] Appl. No.: 486,239

[22] Filed: Apr. 18, 1983

[30] Foreign Application Priority Data

Apr. 23, 1982 [JP] Japan .................................. 57-67100
Apr. 23, 1982 [JP] Japan .................................. 57-67101
Apr. 23, 1982 [JP] Japan .................................. 57-67102

[51] Int. Cl.$^4$ ............................................. B23K 9/23
[52] U.S. Cl. ........................................... 219/137 WM
[58] Field of Search ................................ 219/137 WM

[56] References Cited

U.S. PATENT DOCUMENTS 4,394,560 7/1983 Kishida et al. ............. 219/137 WM
4,396,822 8/1983 Kishida et al. ............. 219/137 WM Primary Examiner—C. L. Albritton
Assistant Examiner—Alfred S. Keve
Attorney, Agent, or Firm—Wenderoth, Lind & Ponack

[57] ABSTRACT

A method for arc welding a very low carbon steel containing 0.005-0.06% C characterized by employing a welding material with nickel together with high carbon so as to form weld metal containing nickel. Solidification cracking on the thus welded metal can be prevented.

16 Claims, 9 Drawing Figures

METHOD FOR WELDING VERY LOW CARBON STEEL

BACKGROUND OF THE INVENTION

1. Field of the Invention

The present invention relates to a method for arc welding a very low carbon steel.

2. Description of the Prior Art

There has been a recent trend to reduce the carbon content in steel, especially for line pipes, off-shore structures and pressure vessels in low temperature use. The main reason for carbon reduction is the importance of weldability and fracture resistance in a weld heat-affected zone of steel. The remarkable advance of thermo-mechanical treatment in steel rolling has made it possible to reduce the carbon content to a very low level without any significant decreases in steel strength.

It has been common knowledge to welding engineers that steel with a lower carbon content is less susceptible to solidification cracking, which occurs in weld metal in arc welding by shielded metal arc welding (referred to as "SMAW" hereinafter) processes and gas metal arc welding (referred to as "GMAW" hereinafter) processes, than that with higher carbon. From this point of view, it has been an established recognition to set the carbon content of weld metal not higher than that of base steel, in order to improve weld metal toughness as well as resistance of weld metal to cold cracking and solidification cracking. No solidification cracking has been considered to occur as long as the carbon content of weld metal is less than 0.15%. No one has doubted that this concept is applicable to weld metal with a very low carbon content of less than 0.10%.

We, the present inventors, have investigated the solidification cracking susceptibility of weld metal using steel containing carbon in an amount of less than 0.06%. In this investigation, we have obtained results contrary to the above common knowledge. The result is that solidification cracking susceptibility has been increased despite reducing the carbon content. The solidification cracking has occurred in SMAW processes with welding speed higher than 30 cm/min, in GMAW using solid wires with the speed higher than 50 cm/min and in GMAW using flux cored wires with the speed higher than 40 cm/min, respectively.

SUMMARYY OF THE INVENTION

It is the prime object of the present invention to provide an arc welding process for a very low carbon steel to prevent the weld solidification cracking.

It is another object of the invention to provide an arc welding process for a very low carbon steel by which the solidification cracking of the weld metal due to high speed welding can be avoided.

BRIEF EXPLANATION OF THE DRAWINGS

Other objects of the invention will be better understood from the following detailed description with reference to the accompanying drawings, in which.

DETAILED DESCRIPTION OF THE INVENTION

The inventors carried out an investigation concerning the various factors which affect solidification cracking of weld metal reduced to the lowest level of carbon content when a very low carbon steel of not higher than 0.06% C is subjected to an arc welding, such as shielded metal arc welding or gas metal arc welding. As a consequence, they have found that nickel is highly effective in preventing solidification cracking. Simultaneously they have succeeded in completely preventing solidification cracking in weld metal with a very low content of carbon by controlling the value of a parameter Q based on the carbon content of the weld metal and the nickel content of the welding material, and even in carrying out the arc welding with welding speed faster than 30 cm/min. Furthermore, they found that solidification cracking of weld metal containing very low carbon can be completely prevented in any shielded or gas metal arc welding, such as in shielded metal arc welding with welding speed faster than 30 cm/min., in gas metal arc welding using solid wires with welding speed faster than 50 cm/min., and in gas metal arc welding using flux cored wires with welding speed faster than 40 cm/min., by forcing nickel, the amount of which exceeds the limit amount thereof determined in accordance with the carbon content of the low carbon, weld metal, into the weld metal via a welding material. Moreover, in case the very low carbon steel contains nickel, solidification cracking can also be obviated by using welding materials in which the nickel content is reduced by the amount of nickel transferred from the steel product to the weld metal.

In accordance with the findings of the inventors, when a very low carbon steel is subjected to arc welding such as shielded and gas metal arc welding using a welding material hitherto commonly applied, solidification cracking very frequently occurs in the weld metal reduced to a very low level of carbon by dilution with the very low carbon steel on account of the increase in susceptibility to high temperature cracking. This is shown in FIG. 1.

Figure 1:
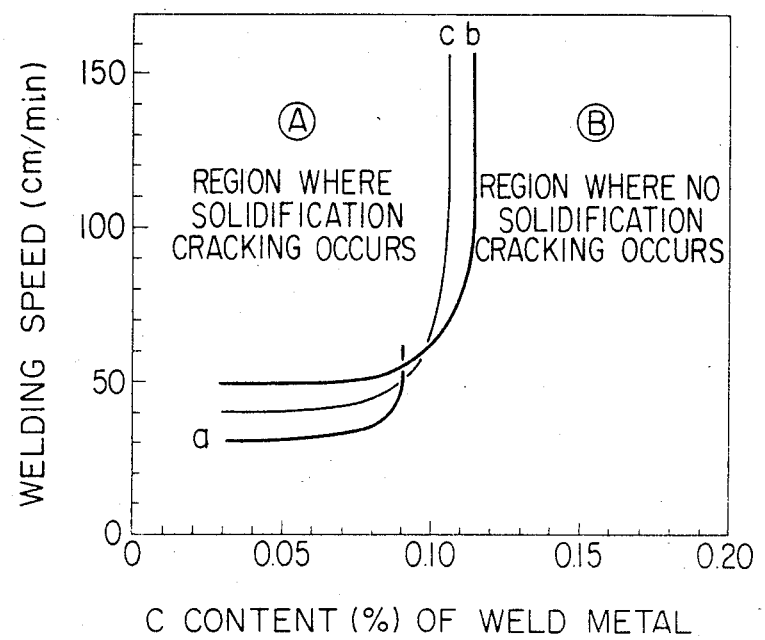
FIG. 1 shows the relationship between the region where solidification cracking occurs in the root of a weld metal, the carbon content of the weld metal, and the welding speed when the arc welding process for very low carbon steel is carried out; (a) indicates the curve for SMAW, (b) the curve for GMAW using solid wired, and (c) the curve for GMAW using flux cored wires.

As described hereinbefore, FIG. 1 shows the relation between the carbon content of the weld metal, the welding speed, and solidification cracking, wherein (a) refers to the shielded metal arc welding process, (b) to the gas metal arc welding process using solid wires, and (c) to the gas metal arc welding process using reflux cored wires.

FIG. 1 was obtained from the results of subjecting a welding test piece shown in Table 2 and having a groove with a shape as shown in Table 1, which was manufactured from a steel product containing 0.01–0.19%C, to root welding using a welding material shown in Table 3 under the welding conditions shown in Table 3.

also depends on the arc welding process used. It is considered that the increase in the susceptibility to solidification cracking of the weld metal is caused by the fact that the solidification of the $\delta$ phase prevails in proportion as the carbon content of the weld metal decreases.

Therefore the present invention is directed to steels in which the solidification of the $\delta$ phase tends to occur in the weld metal, and which has a carbon content of not higher than 0.06%, preferably not higher than 0.04%, and particularly, less than 0.03%. The above steel includes any steel with a very low carbon content insofar as it contains at least 0.005%C, which is regarded as the lower limit for a steel having sufficient strength generally as a steel, such as a general structural steel, welded structural steel, or low alloy steel for cryogenic service.

With a view to carrying out an investigation on the inhibition effect of the $\delta$ phase solidification by means of nickel, which is an alloy element for stabilizing the $\gamma$

TABLE 1

Figure 2:
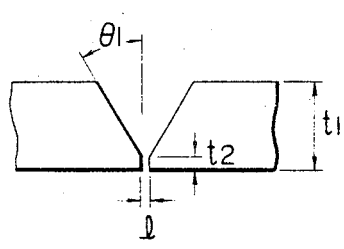
FIG. 2 shows the groove shape for SMAW.
Figure 3:
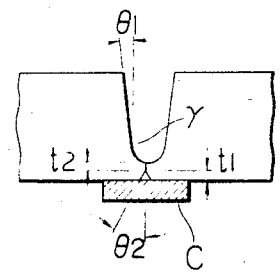
FIG. 3 shows the groove shape for GMAW.

| Welding | Groove Shape | $\theta_1$ | $\theta_2$ | $t_1$ | $t_2$ | l | r | C |
|---|---|---|---|---|---|---|---|---|
| Shielding metal arc welding | FIG. 2 | 30° | — | 19 mm | 1.5 mm | 1.5 mm | — | — |
| Gas metal arc welding | FIG. 3 | 5° | 22.5° | 2.5 mm | 1.5 mm | — | 2.75 mm | Copper backing |

TABLE 2

(unit mm)

Figure 4:
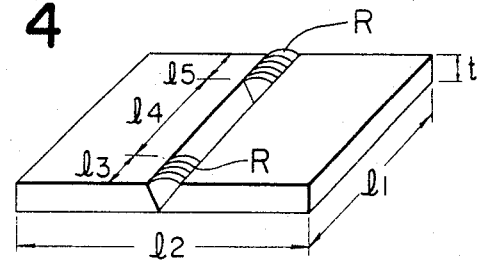
FIG. 4 shows the size and shape of a test specimen for SMAW.
Figure 5:
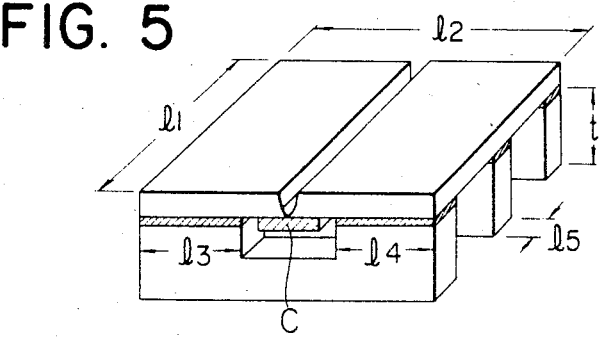
FIG. 5 shows the size and shape of a test specimen for GMAW.

| Welding | Test specimen (for root weld) | $l_1$ | $l_2$ | $l_3$ | $l_4$ | $l_5$ | t | R | C |
|---|---|---|---|---|---|---|---|---|---|
| Shielding metal arc welding | FIG. 4 | 400 | 300 | 75 | 250 | 75 | 19 | Restraint bead | |
| Gas metal arc welding | FIG. 5 | 400 | 300 | 100 | 100 | 30 | 100 | | Copper backing |

TABLE 3

| Welding | Welding Material | Shield Gas | Welding Current (A) | Welding Voltage (V) | Welding Speed (cm/min.) |
|---|---|---|---|---|---|
| Shielded metal arc welding | Cellulose type electrode Core wire C 0.04–0.12% $\frac{\text{Organic substance}}{\text{Coating weight}} = 20\text{–}40\%$ | — | 140~190 | 25~28 | 29~56 |
| Gas metal arc welding | Solid wire 0.9 mm$\phi$ Wire C 0.05–0.35% | $CO_2$ | 220~300 | 25~30 | 40~160 |
| | Flux cored wire: 1.6 mm$\phi$ Metal sheath: C 0.02–0.08% $\frac{\text{Core-ingredient C}}{\text{wire weight}} = 0.02\text{–}0.10\%$ | $CO_2$ | 350~500 | 32~40 | 30~130 |

As is clearly shown in FIG. 1, the region of solidification cracking of the weld metal is closely related to the carbon content of the weld metal and the welding speed in all of the arc welding processes and, namely, it is the region where the carbon content of the weld metal is less than 0.09% and the welding speed is more than 30 cm/min. in the shielded metal arc welding process, the region where the carbon content of the weld metal is less than 0.115% and the welding speed is more than 50 cm/min. in the gas metal arc welding process using a solid wire, and the region where the carbon content of the weld metal is less than 0.105% and the welding speed is more than 40 cm/min. in the gas metal arc welding process using a flux cored wire. Thus, differently from what has been thought up to now, the susceptibility to solidification cracking increases when the welding speed rises above a certain limit, which depends on the particular arc welding process used, and when the carbon content is less than a certain limit that phase, as a countermeasure for preventing solidification cracking of low carbon weld metal, the inventors manufactured various welding materials containing nickel as listed in Table 4, and conducted one-layer welding by using the same welding test as was used to obtain the test results of FIG. 1. Thus, they studied solidification cracking of the root weld metal and obtained the results shown in FIGS. 6–8 for the respective arc welding processes.

TABLE 4

| | Welding | | | |
|---|---|---|---|---|
| | Shielded Metal Arc Welding | | Gas Metal Arc Welding | |
| | Ni source | | | |
| Ni level | Ni in core wire (%) | Ni in coating material (%) | Ni in solid wire (%) | Ni in flux cored wire (%) |
| 1 | 0 | 0 | 0 | 0 |
| 2 | 0 | 3.9 | 1.4 | 0.8 |
| 3 | 1.6 | 3.9 | 2.4 | 1.7 |
| 4 | 1.6 | 7.5 | 3.2 | 2.5 |

Figure 6:
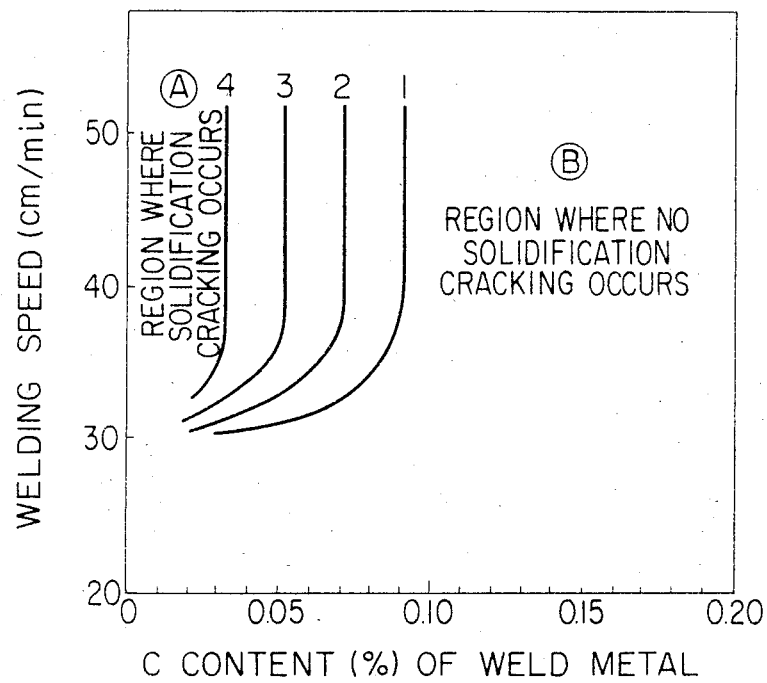
FIG. 6 is a graph showing the effect of nickel on the susceptibility to the solidification cracking which occurs in the root of the weld metal when a very low carbon steel is subjected to shielded metal arc welding.
Figure 7:
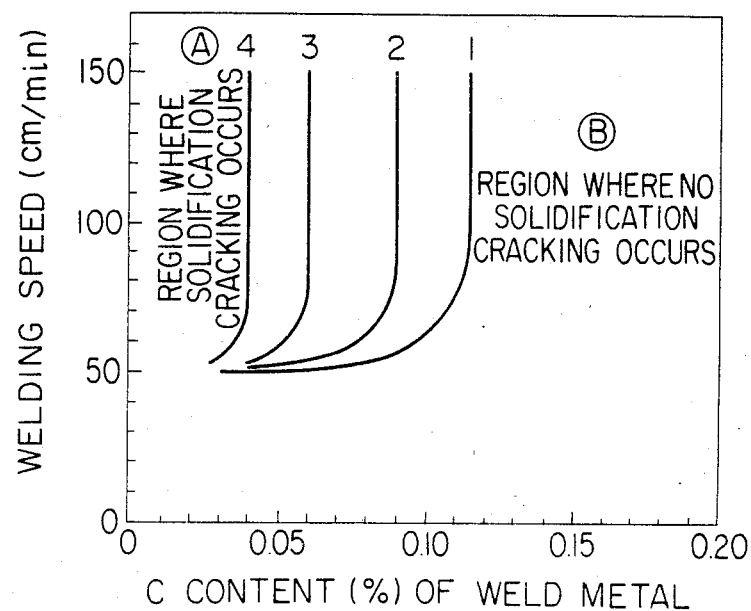
FIG. 7 is also a graph showing the effect of nickel on the susceptibility to the solidification cracking which occurs in the root weld metal when a very low carbon steel is subjected to gas metal arc welding using solid wires.

FIG. 6 shows the shielded metal arc welding process; FIG. 7 the gas metal arc welding process using a solid wire; and FIG. 8 the gas metal arc welding process using a flux cored wire.

By adding nickel to the welding material, it is seen that the upper limit of the carbon content in the region where solidification cracking occurs is shifted to the side of low carbon content. Namely, nickel proves to have a remarkable effect in reducing the susceptibility of low carbon weld metal to solidification cracking.

The occurrence of solidification cracking is not observed regardless of the presence or absence of nickel when the shielded metal arc welding process is carried out at a welding speed of less than 30 cm/min., when gas metal arc welding using a solid wire is carried out at a speed of less than 50 cm/min., or when the gas metal arc welding using a flux cored wire is carried out at a speed of less than 40 cm/min. This is because the molten steel is continuously supplied to the final solidified portion of the weld metal. That is to say, solidification cracking of the low carbon weld metal occurs when the welding speed exceeds 30 cm/min. in the shielded metal arc welding process, exceeds 50 cm/min. in the gas metal arc welding process using a solid wire, and exceeds 40 cm/min. in the gas metal arc welding process using a flux cored wire. Moreover, solidification cracking tends to occur most frequently in the root weld metal on account of its dynamic and metallurgical condition. Hence it is seen that there is almost no danger of solidification cracking of the low carbon weld metal resulting from a subsequent welding process so long as solidification cracking of the root weld metal can be prevented.

In order to prevent solidification cracking of the root weld metal, it is sufficient to use a welding material containing nickel in such an amount as to make $C_{(R)}\%$, i.e., the carbon content of the root weld metal determined by the carbon content of the steel used, the carbon content of the welding material and the welding conditions, higher than the highest value of $C_{(R)}\%$ at which solidification cracking occurs.

Figure 8:
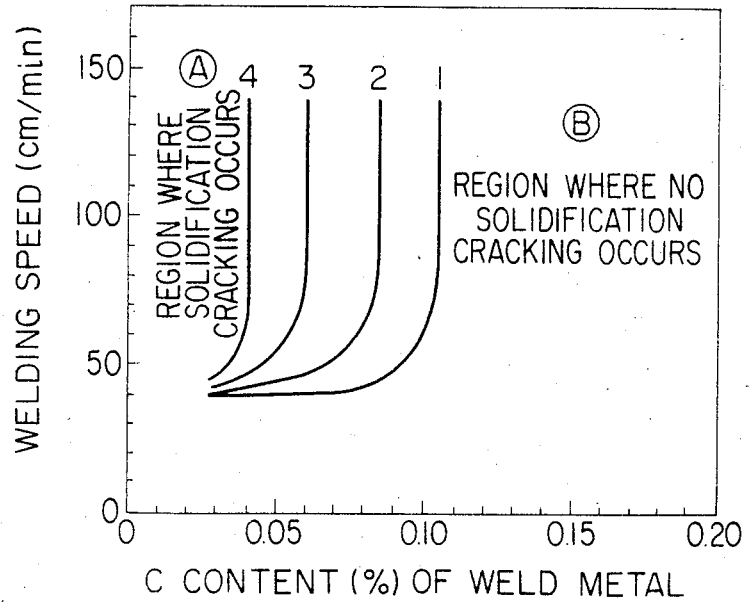
FIG. 8 is another graph showing the effect of nickel on the susceptibility to solidification cracking which occurs in the root weld metal when a very low carbon steel is subjected to gas metal arc welding using flux cored wires.

From FIGS. 6-8, the inventors have obtained the following three formulas showing the relationship between $C_{(R)}$ in the region of no occurrence of solidification cracking and the nickel content of the welding material.

At a welding speed exceeding 30 cm/min. when the shielded metal arc welding process is used:

$$0.32Ni_{(W)} + 0.14Ni_{(f)} \geq 2.3 - 25C_{(R)} \quad (1)$$

where $Ni_{(W)}$: nickel content (%) in core wire of SMAW electrode; and $Ni_{(f)}$: nickel content (%) in coating flux of SMAW electrode.

At a welding speed of more than 50 cm/min. when the gas metal arc welding process using the solid wire is used:

$$0.42Ni_{(W)} \geq 2.1 - 18.3C_{(R)} \quad (2)$$

where $Ni_{(W)}$: nickel content (%) of GMAW solid wire.

At a welding speed of more than 40 cm/min. when the gas metal arc welding process employing a flux cored wire is used:

$$0.55Ni_{(W)} \geq 2.2 - 21C_{(R)} \quad (3)$$

where $Ni_{(W)}$: nickel content (%) of the welding material.

The left sides of the formulas (1)-(3) are unequivocally determined by the nickel content of the welding material. Therefore if the left sides of the formulas (1)-(3) are represented as a nickel parameter P(Ni) (%), the relation shown in FIG. 9 is obtained between $C_{(R)}$ and P(Ni).

Figure 9:
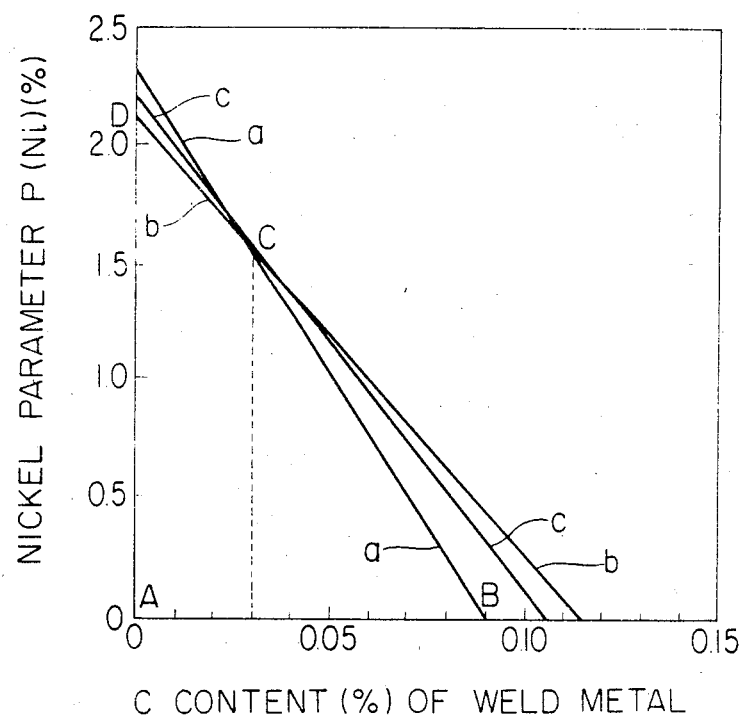
FIG. 9 is a graph showing the relationship between the carbon content of the weld metal, the nickel parameter P(Ni), and solidification cracking wherein (a) refers to the shielded metal arc welding process, (b) to the gas metal arc welding process using solid wires, and (c) to the gas metal arc welding process using flux cored wires.

FIG. 9-(a) refers to shielded metal arc welding, FIG. 9-(b) to gas metal arc welding using a solid wire and FIG. 9-(c) to the gas metal arc welding using a flux cored wire; and in the arc welding process the region of unavoidable occurrence of solidification cracking is indicated by the region of ABCD of FIG. 9.

The straight line BC is the limit line for the occurrence of solidification cracking in shielded metal arc welding process performed at a welding speed of more than 30 cm/min.; the straight line CD is the limit line for the occurrence of solidification cracking in gas metal arc welding using a solid wire performed at a welding speed of more than 50 cm/min.; and the point C corresponds to $C_{(R)}$ equal 0.03%. Accordingly, in order to prevent solidification cracking of a low carbon weld metal, it is required that the parameter $Q_1$ or $Q_2$ of the following formulas be satisfied.

If $C_{(R)} \geq 0.03\%$, it follows from the formula (1) that $$Q_1 = C_{(R)} + P(Ni)/25 \geq 0.09\% \quad (4)$$

If $C_{(R)} < 0.03\%$, it follows from the formula (2) that $$Q_2 = C_{(R)} + P(Ni)/18.3 \geq 0.115\% \quad (5)$$

Thus, it is preferred that $Q_1$ or $Q_2$ should be made to satisfy the requirement of the formula (4) or (5) by controlling the nickel content of the welding material in accordance with the amount of carbon migrating from the very low carbon steel and the welding material to the weld metal.

In the gas metal arc welding process wherein a solid wire is used, solidification cracking will not occur at a welding speed of less than 50 cm/min. Hence the effect on prevention of solidification cracking in the arc welding process will remain substantially unchanged even if the welding speed applied in formula (5) should be extended to 30 cm/min. as in formula (4).

Nickel is sometimes included in very low carbon steel in order to assure good toughness of the welded area. When very low carbon steel containing nickel is subjected to arc welding, nickel in the steel naturally migrates into the weld metal. Therefore the nickel content of the welding material required for the prevention of solidification cracking of the weld metal can be decreased by the amount of nickel migrating from the steel. When nickel contained in the steel migrates during arc welding, it is seen that the loss of nickel resulting by oxidation is ngeligible. Further, the dilution rate of the steel in forming the root weld metal is about 55% in the shielded metal arc welding process and about 58% in the gas metal arc welding process as fully described hereinafter. Hence, it is also seen that the amount of 0.55 $Ni_{(P)}\%$ in the shielded metal arc welding process, and $0.58Ni_{(P)}\%$ in the gas metal arc welding process wherein the solid wire is used, is contained in the respective weld materials.

Accordingly, with a view to preventing solidification cracking of the root weld metal when very low carbon steel containing nickel is subjected to arc welding, it is preferred that the nickel parameter P(Ni) is regulated by the nickel content in the weld material to consider nickel contained in the steel in accordance with the amount of carbon supplied to the weld metal from the very low carbon steel and the weld material, in such manner that the formula (4) (with $Q_1$ replaced by $Q_3$) and the formula (5) (with $Q_2$ replaced by $Q_4$) are satisfied as follows:

In the shielded metal arc welding process, $$P(Ni) = 0.55Ni_{(p)} + 0.32Ni_{(w)} + 0.14Ni_{(f)}$$

and in the gas metal arc welding processing using a solid wire, $$P(Ni) = 0.58Ni_{(p)} + 0.42Ni_{(w)}$$

As explained above, the inventors emphasize the importance of controlling carbon and nickel in order to prevent solidification cracking of the low carbon weld metal. This effect of carbon and nickel in preventing solidification cracking was attained in weld metals containing manganese, an element for stabilizing austenite, in the range of 0.8–2.0%. As, however, manganese has less austenite stabilizing effect than carbon and nickel, solidification cracking of the weld metal can be satisfactorily prevented by controlling carbon and nickel insofar as the manganese content of the weld metal is in the range of 0.8–2.0%.

Next, the assumed carbon content of the weld metal, $C_{(R)}\%$, is explained. $C_{(R)}$ is calculated from the carbon sources, i.e., the steel and the welding material (the latter of which depends on the welding process used), and in general can be expressed as follows:

$$C_{(R)} = \alpha C_{(p)} + \beta C_{(w)} + \gamma C_{(a)} + \delta C_{(o)} + \epsilon C_{(f)} + K$$

where
  $\alpha, \beta, \gamma, \delta$ and $\epsilon$ are constants depending on the welding process, and $\gamma, \delta$ are sometimes zero; and
  $C_{(p)}$: carbon content (%) of the steel used;
  $C_{(w)}$: carbon content (%) of the core wire of SMAW electrode, GMAW solid wire or the metal sheath of the flux cored wire;
  $C_{(a)}$: carbon content (%) in metallic powder of the coating material of the coated electrode;
  $C_{(o)}$: organic substance content (%) in the coating material of SMAW coated electrode;
  $C_{(f)}$: the weight ratio (%) of the carbon content of the core ingredient of the flux cored wire to the total weight of the wire; and
  K: constant peculiar to the welding processes concerned.

Now, the shielded metal arc welding process and the gas metal arc welding process will be separately described.

The formula (1) shows the relation which must be maintained between the nickel content of the electrode in the shielded metal arc welding and the carbon content of the weld metal for effective prevention of solidification cracking of the weld metal when a very low carbon steel is subjected to shielded metal arc welding at a speed of 30 cm/min. or more.

On the other hand, the inventors conducted many tests relating to high speed shielded metal arc welding at welding speeds of 30 cm/min. and higher, and made a detailed study of the relation between the base steel and electrode as carbon source of the carbon content $C_{(R)}$ of the root weld metal. As a result, they found that 55% of the root weld metal is contributed by the base steel and 45% by the welding electrode. The source of carbon of the steel is its carbon content $C_{(p)}$, while the source of carbon of the welding electrode is mainly the carbon content $C_{(w)}$ of the core wire thereof and the carbon content $C_{(a)}\%$ in the metallic powder and the organic substance content $C_{(o)}$ of the coating material. In addition, C sometimes is released by the dissociation of $CO_2$ produced by the decomposition of carbonate and this C migrates into the weld metal. The amount of such carbon is, however, so small as to be negligible.

The dilution rate of the core wire toward the carbon content of the root weld metal is five times that of the coating material. On the other hand, the dilution rate of carbon resulting from the organic substance content in the coating flux is 1/150 that of the metallic powder. On the basis of these findings, an assumed formula (6) of $C_{(R)}$ was obtained as follows:

$$C_{(R)} = 0.55C_{(p)} + 0.45C_{(w)} + 0.09C_{(a)} + 0.0006C_{(o)} \qquad (6)$$

From the formulas (1) and (6), it was found that solidification cracking of low carbon weld metal can be prevented merely by controlling the nickel content in the core wire and the coating material of the welding electrode so as to satisfy the following formula:

$$0.32Ni_{(w)} + 0.14Ni_{(f)} \geq 2.3 - (13.8C_{(p)} + 11.3C_{(w)} + 2.26C_{(a)} + 0.015C_{(o)}) \qquad (7)$$

When very low carbon steel containing nickel is subjected to shielded metal arc welding, the total amount of nickel of the welding electrode required for the prevention of solidification cracking of the weld metal can be decreased by an amount equal to the amount of nickel migrating from the steel used. It should here be noted that the total amount of nickel of the welding electrode can be represented by the following formula:

Total amount of Ni of welding electrode = $\dfrac{\text{(Core wire weight)} \times \text{(Core wire Ni \%)} + \text{(Coating material weight)} \times \text{(Coating material Ni \%)}}{\text{Total weight of welding electrode}}$ As mentioned above, in the shielded metal arc welding process carried out at a welding speed of 30 cm/min. or higher, the dilution rate of the steel toward the formation of the root weld metal is 55%, and that of the welding electrode is 45%. Moreover, as hardly any nickel is lost by oxidation during welding, the nickel migrates from the steel and the welding electrode into the weld metal. Hence, it follows that the amount of Ni contained in the welding electrode can be deemed to be 0.55 $Ni_{(p)}$%.

Accordingly, it has been confirmed that the amount of nickel contained in the core wire of the welding electrode as well as in the coating flux should satisfy the following formula from the above-mentioned reason and the formula (7) in order to completely prevent solidification cracking of the root weld metal when very low carbon steel containing nickel is subjected to shielded metal arc welding at high speed:

$$0.55Ni_{(p)} + 0.32 Ni_{(w)} + 0.14Ni_{(f)} \geq 2.3 - (13.8C_{(p)} + 11.3C_{(w)} + 2.26 C_{(a)} + 0.015C_{(o)})$$

In order to make a welding electrode containing about 10%Ni by weight, it is most economical to add nickel, such as metallic nickel or ferronickel, to the coating flux in the form of powder, and to use a core wire made of mild steel. However, if the nickel powder contained in the coating flux exceeds 15%, the coating flux tends to peel off during welding and there is a danger that the nickel powder contained in the coating flux which migrates into the weld metal will not uniformly mix into the weld pool so that it partly segregates. Therefore, if it is required to add nickel powder in an amount of more than 15% to the coating flux, it is preferable that the coating flux should contain up to 15Ni, and the shortage be made up by nickel in the core wire.

On the other hand, it is of course possible to add about 10%Ni to the core wire of the welding electrode as the total amount of nickel. However, if the core wire of mild steel should contain nickel, the specific electric resistance of the core wire is considerably increased. Therefore, if the nickel content of the core wire exceeds 5%, then it follows that the shape of the coating flux in the arc of a welding electrode end will be deformed during welding so that the welding workability will be impaired, and besides, the manufacturing cost of the core wire will be higher. Thus it is preferable to limit the nickel content of the core wire up to 5%. In case the amount of nickel supplied from the core wire is not sufficient, it is preferable to add more nickel powder to the coating flux.

The formula (2) shows the relation that must be maintained between the nickel content of the solid wire used for gas metal arc welding and the carbon content of the weld metal for effective prevention of solidification cracking of the weld metal when very low carbon steel is subjected to gas metal arc welding using a solid wire at a welding speed of 50 cm/min. or more.

On the other hand, the inventors carried out many tests relating to the gas metal arc welding at welding speed of 50 cm/min. and higher, and conducted an extensive and detailed study in connection with the mutual relation between the carbon content $C_{(R)}$ of the root weld metal, the carbon content $C_{(p)}$ of the steel, and the carbon content $C_{(w)}$ of the solid wire. As a result, the following assumed formula (8) of $C_{(R)}$ was obtained:

$$C_{(R)} = 0.52C_{(p)} + 0.37C_{(w)} + 0.02 \quad (8)$$

It was found from the formulas (2) and (8) that in order to prevent solidification cracking of the low carbon weld metal, the nickel content of the solid wire should satisfy the following formula (9):

$$0.42Ni_{(w)} \geq 1.74 - (9.52C_{(p)} + 6.77C_{(w)}) \quad (9)$$

Next, when a very low carbon steel containing nickel is subjected to gas metal arc welding, the nickel content of the solid wire required for preventing solidification cracking can be decreased by an amount equal to the amount of nickel migrating from the steel.

In gas metal arc welding at a welding speed of 50 cm/min. or higher, the dilution rate of the steel toward the formation of the root weld metal is 58%. Moreover, there is almost no oxidation loss of nickel during welding. Hence, it follows that the amount of Ni of the steel, $Ni_{(p)}$, corresponds to the nickel content of $0.58Ni_{(p)}$ of the solid wire.

Accordingly, in order to completely prevent solidification cracking of the root weld metal when very low carbon steel containing nickel is subjected to gas metal arc welding process, it is sufficient in view of the above and formula (9) for the nickel content of the solid wire to satisfy the following formula (10):

$$0.58Ni_{(p)} + 0.42Ni_{(w)} \geq 1.74 - (9.52C_{(p)} + 6.77C_{(w)}) \quad (10)$$

The solid wire for use in the present invention is suitable so long as it satisfies the above formulas. However, from a practical point of view, the solid wire is a steel welding wire containing as basic composition 0.07–0.15%C, 0.30–1.00%Si, 1.00–1.80%Mn, 0.5–2.5-%Ni, less than 0.025%P, and less than 0.025%S. Also, as additional elements, it may contain one or more of Cr, Mo, V, Ti, Al and Cu within the preferred ranges of less than 1%Mo, less than 1%Cr, less than 0.1%V, less than 0.2%Ti, less than 0.2%Al, and less than 0.5%Cu.

The formula (3) shows the relation to be maintained between the nickel content of the flux cored wire used in gas shielded metal arc welding and the carbon content of the weld metal for effectively preventing solidification cracking when very low carbon steel is subjected to gas shielded metal arc welding using a flux cored wire at a welding speed of higher than 40 cm/min.

The inventors performed many tests relating to gas shielded metal arc welding carried out at welding speeds of 40 cm/min. and higher, and conducted an extensive and detailed study in connection with the mutual relation among the carbon content $C_{(R)}$ of the root weld metal, the carbon content $C_{(p)}$ of the steel, the carbon content $C_{(w)}$ of the metal sheath of the flux cored wire, and the carbon content $C_{(f)}$ of the core ingredients. As a result, they obtained the assumed formula (11) of $C_{(R)}$ as follows:

$$C_{(R)} = 0.38C_{(p)} + 0.37C_{(w)} + 0.47C_{(f)} + 0.01 \quad (11)$$

From the formulas (3) and (11), solidification cracking of the low carbon weld metal can be prevented if the nickel content of flux cored wire satisfies the following formula (12):

$$0.55Ni_{(w)} \geq 2.0 - (8.0C_{(p)} + 7.8C_{(w)} + 9.9C_{(f)}) \quad (12)$$

Next, when very low carbon steel containing nickel is subjected to gas shielded metal arc welding, the nickel content of the flux cored wire required for preventing solidification cracking can be decreased by an amount equal to the amount of nickel migrating from the steel.

The dilution rate of the steel toward the formation of the root weld metal is 45% in gas shielded metal arc welding carried out at a welding speed of 40 cm/min. or higher, and there is almost no oxidation loss of nickel during welding. Accordingly, it follows that the nickel content $Ni_{(p)}$ of the steel corresponds to the nickel content 0.45 $Ni_{(p)}$ of the flux cored wire.

From the above and formula (12), therefore, it is preferred that the nickel content of the flux cored wire satisfy the following formula in order to completely prevent solidification cracking of the root weld metal when very low carbon steel containing nickel is subjected to gas shielded metal arc welding:

$$0.45Ni_{(p)} + 0.5 - 5Ni_{(w)} \geq 2.0 - (8.0C_{(p)} + 7.8C_{(w)} + 9.9C_{(f)})$$

The flux cored wire used in the present invention should satisfy the above-mentioned relationship, and it is preferred to add nickel to the core ingredients in the form of nickel or ferronickel powder. From a practical point of view, it is desirable to add 1.0–2.5%Ni relative to the weight of the wire. Additional elements and compounds can be added to the core. For example, manganese and silicon, which act as deoxidizer or alloying element, can be added in the amounts of 0.5–3.5%Mn and 0.1–1.5%Si, and it is also possible to add up to 20% of one or more oxides selected from $TiO_2$, $ZrO_2$, $Al_2O_3$ and $SiO_2$. In addition, any of various fluorides and carbonates can be included as an arc stabilizer, and additional ingredients such as metallic powder can be also added.

A mild steel having good workability is used as the metal sheath of the wire in the present invention. The sectional shape of the flux cored wire is not specified. The invention type, seamless wire or any other type will do. The core ingredient of the flux cored wire is preferred to be 10–30% of wire by weight.

Next, the present invention will be specifically explained with reference to the following examples.

EXAMPLE 1

An extensive and detailed study was made on solidification cracking of weld metal using welding test specimens (as shown in FIG. 4) made from thick steel plate of the chemical composition indicated in Table 5 and having a groove (FIG. 2). The test specimens were subjected to single pass welding using a coated electrode (Table 6) under specific welding conditions (Table 7). The test results are shown in Table 8.

X-ray penetrant test and observation of the section of the weld bead revealed no solidification cracking whatever in the test specimens falling within the scope of the present invention.

TABLE 5

| No. | Wall thickness (mm) | C | Si | Mn | P | S | Ni | Mo | V | Nb | Al |
|---|---|---|---|---|---|---|---|---|---|---|---|
| P-1 | 19 | 0.008 | 0.15 | 1.60 | 0.017 | 0.005 | — | — | — | 0.040 | 0.035 |
| P-2 | 19 | 0.020 | 0.49 | 0.50 | 0.013 | 0.005 | 2.45 | 0.10 | — | — | 0.022 |
| P-3 | 19 | 0.034 | 0.16 | 1.61 | 0.016 | 0.003 | — | — | — | 0.045 | 0.020 |
| P-4 | 19 | 0.012 | 0.20 | 1.52 | 0.012 | 0.004 | — | — | — | 0.041 | 0.015 |
| P-5 | 19 | 0.016 | 0.24 | 1.57 | 0.018 | 0.003 | 0.54 | — | 0.070 | 0.040 | 0.017 |

(weight %)

TABLE 6

| | | Electrode Total Ni | Core wire | | Coating Material | | | | | | | |
|---|---|---|---|---|---|---|---|---|---|---|---|---|
| No. | Coating type | amount | C | Ni | Lime carbonate | Fluorspar | Rutile | Fe—Mn* | Fe—Si | Metallic Ni | Organic substance | Other ingredient |
| E-1 | low hydrogen type | 3.1 | 0.06 | 0 | 40 | 18 | 3 | 0 | 13 | 10 | 1 | 15 |
| E-2 | low hydrogen type | 4.9 | 0.04 | 1.7 | 42 | 20 | 3 | 0 | 13 | 12 | 1 | 15 |
| E-3 | high cellulose type | 3.2 | 0.06 | 0 | 0 | 0 | 12 | 8 | 0 | 10 | 30 | 40 |
| E-4 | high cellulose type | 1.9 | 0.05 | 0 | 0 | 0 | 13 | 7 | 0 | 6 | 32 | 42 |
| E-5 | high cellulose type | 0 | 0.05 | 0 | 0 | 0 | 12 | 8 | 0 | 0 | 35 | 45 |

(weight %)

*Carbon content of Fe—Mn is 0.5%

TABLE 7

| Welding Electrode | Electrode Diameter (mm) | Welding Current (A) | Welding Voltage (V) | Welding Speed (cm/min.) |
|---|---|---|---|---|
| Low Hydrogen Type | 3.2 | 130–150 | 23–25 | 35–42 |
| High Cellulose Type | 4.0 | 140–190 | 25–28 | 25–53 |

TABLE 8

| Section | Steel Plate | Welding Electrode | Welding Speed (cm/min.) | $C_{(R)}$ (%) | $Q_1$ or $Q_4$ (%) | $Q_3$ or $Q_4$ (%) | A | B | C | Solidification Cracking X-ray Penetrant Test | Bead Section Test |
|---|---|---|---|---|---|---|---|---|---|---|---|
| This invention | P-2 | E-2 | 42 | 0.036 | — | 0.179 | 1.39 | — | 3.57 | O | O |
| | P-3 | E-4 | 53 | 0.064 | 0.098 | — | 0.71 | 0.84 | — | O | O |
| | P-4 | E-3 | 48 | 0.054 | 0.110 | — | 0.92 | 1.40 | — | O | O |
| | P-5 | E-4 | 50 | 0.046 | — | 0.092 | 0.96 | — | 1.14 | O | O |

TABLE 8-continued

| Section | Steel Plate | Welding Electrode | Welding Speed (cm/min.) | $C_{(R)}$ (%) | $Q_1$ or $Q_4$ (%) | $Q_3$ or $Q_4$ (%) | A | B | C | Solidification Cracking | |
|---|---|---|---|---|---|---|---|---|---|---|---|
| | | | | | | | | | | X-ray Penetrant Test | Bead Section Test |
| | P-3 | E-1 | 35 | 0.046 | 0.112 | — | 1.14 | 1.40 | — | O | O |
| Comparison | P-1 | E-1 | 35 | 0.032 | 0.088 | — | 1.50 | 1.40 | — | X | X |
| | P-4 | E-4 | 47 | 0.052 | 0.086 | — | 1.01 | 0.84 | — | X | X |
| | P-3 | E-5 | 50 | 0.066 | 0.066 | — | 0.65 | 0 | — | X | X |

Note:
$A = 2.3 - (13.8C_{(p)} + 11.3C_{(w)} + 2.26C_{(a)} + 0.015C_{(o)})$
$B = 0.32Ni_{(w)} + 0.14Ni_{(f)}$
$C = 0.55Ni_{(p)} + 0.32Ni_{(w)} + 0.14Ni_{(f)}$
O cracking: no
X Cracking: yes

EXAMPLE 2

A steel pipe (outside diameter 1.219 mm × 1000 mm) having a groove as shown in FIG. 2 and having the chemical composition shown in Table 9 was subjected to root welding using a coated electrode shown in Table 6 under the welding conditions as shown in Table 10. The test results are shown in Table 11.

X-ray penetrant test and observation of the section of the weld bead revealed no solidification cracking whatever in the weld metals falling within the scope of the present invention.

EXAMPLE 3

A welding test sample (FIG. 5) was made from a thick steel plate having the chemical composition shown in Table 12. The test sample had a groove as shown in FIG. 3 and was subjected to single pass welding using a solid wire under the welding conditions of Table 14. Solidification cracking of the weld metal was examined. The results are shown in Table 15.

X-ray penetrant test and observation of the section of the weld bead revealed no solidification cracking whatever in the test samples falling within the scope of the present invention.

TABLE 9

| No. | Wall thickness (mm) | C | Si | Mn | P | S | Ni | Cr | V | Nb | Ti | Al |
|---|---|---|---|---|---|---|---|---|---|---|---|---|
| | | | | | | | | | | | | (weight %) |
| P-6 | 16 | 0.018 | 0.16 | 1.83 | 0.015 | 0.003 | — | — | — | 0.043 | 0.017 | 0.012 |
| P-7 | 16 | 0.045 | 0.20 | 1.21 | 0.017 | 0.005 | 0.15 | 0.48 | 0.07 | 0.030 | 0.011 | 0.018 |

TABLE 10

| Welding Position | Welding Current (A) | Welding Voltage (V) | Welding Speed (cm/min.) |
|---|---|---|---|
| All position | 140–190 | 20–29 | 22–59 |

TABLE 12

| No. | C | Si | Mn | P | S | Ni | Mo | V | Nb | Ti |
|---|---|---|---|---|---|---|---|---|---|---|
| | | | | | | | | | | (weight %) |
| P-1 | 0.006 | 0.25 | 1.87 | 0.018 | 0.005 | — | — | — | 0.042 | 0.018 |
| P-2 | 0.011 | 0.33 | 1.75 | 0.014 | 0.007 | 0.63 | — | — | 0.040 | 0.015 |
| P-3 | 0.035 | 0.28 | 1.61 | 0.016 | 0.003 | — | — | 0.069 | 0.037 | 0.013 |
| P-4 | 0.050 | 0.32 | 1.57 | 0.017 | 0.004 | — | 0.20 | 0.072 | 0.042 | 0.011 |

TABLE 13

| No. | C | Si | Mn | S | P | Ni |
|---|---|---|---|---|---|---|
| | | | | | | (weight %) |
| E-1 | 0.06 | 0.87 | 1.20 | 0.005 | 0.012 | — |
| E-2 | 0.01 | 0.90 | 1.38 | 0.007 | 0.010 | 3.90 |
| E-3 | 0.12 | 0.84 | 1.31 | 0.005 | 0.016 | — |

TABLE 11

| Section | Steel Pipe | Welding Electrode | Welding Speed (cm/min.) | $C_{(R)}$ (%) | $Q_1$ or $Q_2$ (%) | $Q_3$ or $Q_4$ (%) | A | B | C | Solidification Cracking | |
|---|---|---|---|---|---|---|---|---|---|---|---|
| | | | | | | | | | | X-ray Penetrant Test | Bead Section Test |
| This | P-6 | E-3 | 55 | 0.059 | 0.115 | — | 0.83 | 1.40 | — | O | O |
| Invention | P-6 | E-3 | 38 | 0.059 | 0.115 | — | 0.83 | 1.40 | — | O | O |
| | P-7 | E-4 | 55 | 0.070 | — | 0.107 | 0.55 | — | 0.92 | O | O |
| | P-7 | E-4 | 38 | 0.070 | — | 0.107 | 0.55 | — | 0.92 | O | O |
| Comparison | P-6 | E-5 | 55 | 0.057 | 0.057 | — | 0.87 | 0 | — | X | X |
| | P-6 | E-5 | 38 | 0.057 | 0.057 | — | 0.87 | 0 | — | X | X |
| | P-7 | E-5 | 55 | 0.072 | — | 0.075 | 0.50 | — | 0.08 | X | X |
| | P-7 | E-5 | 38 | 0.072 | — | 0.075 | 0.50 | — | 0.08 | X | X |

Note:
$A = 2.3 - (13.8C_{(p)} + 11.3C_{(w)} + 2.26C_{(a)} + 0.015C_{(o)})$
$B = 0.32Ni_{(w)} + 0.14Ni_{(f)}$
$C = 0.55Ni_{(p)} + 0.32Ni_{(w)} + 0.14Ni_{(f)}$
O Cracking: no
X Cracking: yes

TABLE 13-continued

| No. | C | Si | Mn | S | P | Ni (weight %) |
|-----|------|------|------|-------|-------|------|
| E-4 | 0.10 | 0.91 | 1.36 | 0.006 | 0.013 | 1.66 |
| E-5 | 0.10 | 0.88 | 1.29 | 0.008 | 0.013 | 2.33 |
| E-6 | 0.09 | 0.94 | 1.40 | 0.008 | 0.015 | 0.40 |

TABLE 14

| Diameter of Solid Wire (mm) | Shield Gas | Welding Current (A) | Welding Voltage (V) | Welding Speed (cm/min.) |
|---|---|---|---|---|
| 0.9 | $CO_2$ | 240–290 | 26–29 | 60–140 |

TABLE 15

| Section | Plate | Solid Wire | Welding Speed (cm/min.) | $C_{(R)}$ (%) | $Q_1$ to $Q_2$ (%) | $Q_3$ or $Q_4$ (%) | A | B | C | Solidification Cracking | |
|---|---|---|---|---|---|---|---|---|---|---|---|
| | | | | | | | | | | X-ray Penetrant Test | Bead Section Test |
| This invention | P-1 | E-2 | 100 | 0.027 | 0.117 | — | 1.62 | 1.64 | — | O | O |
| | P-2 | E-4 | 60 | 0.063 | — | 0.098 | 0.96 | — | 1.06 | O | O |
| | P-3 | E-5 | 140 | 0.076 | 0.106 | — | 0.72 | 0.97 | — | O | O |
| | P-4 | E-4 | 85 | 0.083 | 0.105 | — | 0.58 | 0.70 | — | O | O |
| Comparison | P-1 | E-1 | 100 | 0.045 | 0.045 | — | 1.28 | 0 | — | X | X |
| | P-2 | E-3 | 60 | 0.070 | — | 0.084 | 0.82 | — | 0.37 | X | X |
| | P-4 | E-6 | 85 | 0.080 | 0.085 | — | 0.65 | 0.17 | — | X | X |

Note:
A = 1.74 − (9.52$C_{(p)}$ + 6.77$C_{(w)}$)
B = 0.42$Ni_{(w)}$
C = 0.58$Ni_{(p)}$ + 0.42$Ni_{(w)}$
O Cracking: No
X Cracking: Yes

EXAMPLE 4

A steel pipe (outside diameter 1219 mm × 1000 mm) having a groove as shown in FIG. 3 and a chemical composition as shown in Table 16 was subjected to root welding using a solid wire as shown in Table 13 under the welding conditions of Table 17. The test results are shown in Table 18.

X-ray penetrant test and observation of the section of the weld bead revealed no solidification cracking whatever in the weld metals falling within the scope of the present invention.

TABLE 16

| No. | Wall thickness (mm) | C | Si | Mn | P | S | Ni | Cr | V | Nb | Ti | Al (weight %) |
|---|---|---|---|---|---|---|---|---|---|---|---|---|
| P-5 | 16 | 0.020 | 0.19 | 1.77 | 0.013 | 0.005 | — | — | — | 0.040 | 0.013 | 0.015 |
| P-6 | 16 | 0.042 | 0.20 | 1.35 | 0.017 | 0.005 | 0.20 | 0.45 | 0.05 | 0.033 | 0.011 | 0.020 |

TABLE 17

| Welding Position | Diameter of Welding Wire (mm) | Shield Gas | Welding Current (A) | Welding Voltage (V) | Welding Speed (cm/min) |
|---|---|---|---|---|---|
| All position | 0.9 | $CO_2$ | 230–300 | 27–31 | 60–140 |

TABLE 18

| Section | Steel Pipe | Solid Wire | Welding Speed (cm/min.) | $C_{(R)}$ (%) | $Q_1$ or $Q_2$ (%) | $Q_3$ or $Q_4$ (%) | A | B | C | Solidification Cracking | |
|---|---|---|---|---|---|---|---|---|---|---|---|
| | | | | | | | | | | X-ray Penetrant Test | Bead Section Test |
| This Invention | P-5 | E-5 | 60 | 0.068 | 0.098 | — | 0.87 | 0.98 | — | O | O |
| | P-5 | E-5 | 110 | 0.068 | 0.098 | — | 0.87 | 0.98 | — | O | O |
| | P-6 | E-2 | 110 | 0.064 | — | 0.113 | 0.93 | — | 1.59 | O | O |
| | P-6 | E-2 | 140 | 0.064 | — | 0.113 | 0.93 | — | 1.59 | O | O |
| Comparison | P-5 | E-4 | 60 | 0.068 | 0.089 | — | 0.87 | 0.70 | — | X | X |
| | P-5 | E-4 | 110 | 0.068 | 0.089 | — | 0.87 | 0.70 | — | X | X |
| | P-6 | E-6 | 60 | 0.075 | — | 0.085 | 0.73 | — | 0.46 | X | X |
| | P-6 | E-6 | 110 | 0.075 | — | 0.085 | 0.73 | — | 0.46 | X | X |

Note:
A = 1.74 − (9.52$C_{(p)}$ + 6.77$C_{(w)}$)
B = 0.42$Ni_{(w)}$
C = 0.58$Ni_{(p)}$ + 0.42$Ni_{(w)}$
O Cracking: No
X Cracking: Yes

EXAMPLE 5

A welding test sample as shown in FIG. 5 having a groove as shown in FIG. 3 was made from a thick steel plate having a chemical composition as shown in Table 19, and the thus prepared welding test sample was subjected to single pass welding using a flux cored wire of 1.6 mmφ as shown in Table 20 under the welding conditions of Table 21. The weld metals were examined for solidification cracking. The test results are shown in Table 22.

X-ray penetrant test and observation of the section of the weld bead showed that the test samples falling within the scope of the present invention had no solidification cracking.

TABLE 19

| No. | C | Si | Mn | P | S | Ni | Mo | V | Nb | Ti |
|---|---|---|---|---|---|---|---|---|---|---|
| | | | | | | | | | (weight %) | |
| P-1 | 0.012 | 0.20 | 1.80 | 0.015 | 0.006 | — | — | — | 0.050 | 0.013 |
| P-2 | 0.010 | 0.25 | 1.72 | 0.018 | 0.006 | 0.75 | — | — | 0.046 | 0.018 |
| P-3 | 0.038 | 0.30 | 1.68 | 0.016 | 0.004 | — | — | 0.055 | 0.039 | 0.015 |
| P-4 | 0.053 | 0.28 | 1.55 | 0.017 | 0.003 | — | 0.20 | 0.063 | 0.041 | 0.012 |

TABLE 20

| | Metal Sheath | Core Material | | | | | Flux Ratio |
|---|---|---|---|---|---|---|---|
| No. | C | Rutile | SiMn* | Ni | Iron Powder | Other Ingredient | |
| E-1 | 0.06 | 6.2 | 4.2 | 1.2 | 1.9 | 2.0 | 15.5 |
| E-2 | 0.05 | 6.8 | 4.0 | 1.7 | 2.4 | 0.9 | 15.8 |
| E-3 | 0.07 | 8.4 | 4.6 | 2.3 | 1.8 | 1.1 | 18.2 |
| E-4 | 0.06 | 7.5 | 4.2 | 3.3 | 0.8 | 0.8 | 16.6 |

*Carbon content of SiMn: 0.5%

TABLE 21

| Wire diameter (mm) | Shield Gas | Current Current (A) | Voltage Voltage (V) | Welding Speed (cm/min.) |
|---|---|---|---|---|
| 1.6 | $CO_2$ | 370–500 | 33–40 | 50–130 |

TABLE 22

| Section | Steel Plate | Flux Wire | Welding Speed (cm/min.) | A | B | C | Solidification Cracking X-ray Penetrant Test | Bead Section Test |
|---|---|---|---|---|---|---|---|---|
| This Invention | P-1 | E-4 | 50 | 1.24 | 1.81 | — | O | O |
| | P-2 | E-3 | 80 | 1.18 | — | 1.60 | O | O |
| | P-3 | E-4 | 130 | 1.03 | 1.81 | — | O | O |
| | P-4 | E-3 | 100 | 0.83 | 1.27 | — | O | O |
| Comparison | P-1 | E-2 | 50 | 1.31 | 0.94 | — | X | X |
| | P-2 | E-1 | 80 | 1.25 | — | 1.00 | X | X |
| | P-3 | E-1 | 130 | 1.03 | 0.66 | — | X | X |
| | P-4 | E-2 | 100 | 0.99 | 0.94 | — | X | X |

Note:
A = 2.0 − (8.0$C_{(p)}$ + 7.8$C_{(w)}$)
B = 0.55$Ni_{(f)}$
C = 0.45$Ni_{(p)}$ + 0.55$Ni_{(f)}$
O Cracking: No
X Cracking: Yes

EXAMPLE 6

A steel pipe (outside diameter 1219 mm × 1000 mm) having the chemical composition of Table 23 and having a groove as shown in FIG. 3 was subjected to root welding using a flux cored wire as shown in Table 20 under the welding conditions as shown in Table 24. The test results are shown in Table 25.

X-ray penetrant test and observation of the section of the weld bead revealed no solidification cracking whatever in the weld metals falling within the scope of the present invention.

TABLE 23

| No. | Wall thickness (mm) | C | Si | Mn | P | S | Ni | Cr | V | Nb | Ti |
|---|---|---|---|---|---|---|---|---|---|---|---|
| | | | | | | | | | | (weight %) | |
| P-5 | 16 | 0.014 | 0.21 | 1.93 | 0.018 | 0.007 | — | — | — | 0.042 | 0.019 |
| P-6 | 16 | 0.050 | 0.29 | 1.30 | 0.015 | 0.006 | 0.36 | 0.41 | 0.063 | 0.036 | 0.013 |

TABLE 24

| Welding Position | Wire Diameter (mm) | Shield Gas | Welding Current (A) | Welding Voltage (V) | Welding Speed (cm/min.) |
|---|---|---|---|---|---|
| All | 1.6 | $CO_2$ | 350–480 | 32–39 | 60–130 |

TABLE 25

| Section | Steel Pipe | Flux Cored Wire | Welding Speed (cm/min.) | A | B | C | Solidification Cracking X-ray Penetrant Test | Bead Section Test |
|---|---|---|---|---|---|---|---|---|
| This Invention | P-5 | E-4 | 60 | 1.22 | 1.81 | — | O | O |
| | " | " | 100 | " | " | — | O | O |
| | " | " | 130 | " | " | — | O | O |
| | P-6 | E-3 | 60 | 0.86 | — | 1.43 | O | O |
| | " | " | 100 | " | — | " | O | O |
| | " | " | 130 | " | — | " | O | O |
| Comparison | P-5 | E-2 | 60 | 1.30 | 0.93 | — | X | X |
| | " | " | 100 | " | " | — | X | X |
| | " | " | 130 | " | " | — | X | X |
| | P-6 | E-1 | 60 | 0.93 | — | 0.82 | X | X |
| | " | " | 100 | " | — | " | X | X |

TABLE 25-continued

| Section | Steel Pipe | Flux Cored Wire | Welding Speed (cm/min.) | A | B | C | Solidification Cracking | |
|---|---|---|---|---|---|---|---|---|
| | | | | | | | X-ray Penetrant Test | Bead Section Test |
| | " | " | 130 | " | — | " | X | X |

Note:
A = 2.0 − (8.0$C_{(p)}$ + 7.8$C_{(t)}$ + 9.9$C_{(w)}$)
B = 0.55$Ni_{(f)}$
C = 0.45$Ni_{(p)}$ + 0.55$Ni_{(f)}$
O Cracking: No
X Cracking: Yes

What is claimed is:

1. A method for arc welding carbon steel containing from 0.005 to 0.06% carbon, which comprises subjecting said steel to a plurality of welding passes at a welding speed of at least 30 cm/min, at least the first pass being made by nickel-bearing welding materials having a nickel content such that $Q_1$ in the following formula is at least 0.09% and the carbon content of the weld metal is at least 0.03%:

$$Q_1 = C_{(R)} + P_{(Ni)}/25, \text{ where}$$
$$P_{(Ni)} = 0.32Ni_{(w)} + 0.14Ni_{(f)}$$

in which $C_{(R)}$: carbon content (%) of weld metal,
$P_{(Ni)}$: nickel parameter relating to nickel content, wherein $P_{(Ni)}$ is a positive value,
$Ni_{(w)}$: nickel content (%) of a member selected from the group consisting of GMAW solid wire and core wire of SMAW electrode,
$Ni_{(f)}$: nickel content (%) of coating flux of SMAW electrode.

2. A shielded metal arc welding process as claimed in claim 1, characterized by employing SMAW electrodes with a nickel content which satisfies the following formula:

$$0.32Ni_{(w)} + 0.14Ni_{(f)} \geq 2.3 - (13.8C_{(p)} + 11.3C_{(w)} + 2.26C_{(a)} + 0.015C_{(o)})$$

where $Ni_{(w)}$: nickel content (%) in core wire of SMAW electrode,
$Ni_{(f)}$: nickel content (%) in metallic powder of coating flux of SMAW electrode,
$C_{(p)}$: carbon content (%) of base steel,
$C_{(w)}$: nickel content (%) in core wire of SMAW electrode,
$C_{(a)}$: carbon content (%) in metallic powder of coating flux,
$C_{(o)}$: organic substance amount (%) in coating flux.

3. A gas metal arc welding process as claimed in claim 1, characterized by a welding speed faster than 50 cm/min and employing solid wire with nickel whose content which satisfies the following formula:

$$0.42Ni_{(w)} \geq 1.74 - (9.52C_{(o)} + 6.77C_{(w)})$$

where $Ni_{(w)}$: nickel content (%) of solid wire,
$C_{(p)}$: carbon content (%) of base steel,
$C_{(w)}$: carbon content (%) of solid wire.

4. A gas metal arc welding process as claimed in claim 1, characterized by a welding speed faster than 40 cm/min and employing flux cored wires with a nickel content which satisfies the following formula:

$$0.55Ni_{(w)} \geq 2.0 - (8.0C_{(p)} + 7.8C_{(w)} + 9.9C_{(f)})$$

where $Ni_{(w)}$: nickel content (%) in core flux of FCAW electrode expressed as a % of the total weight of the electrode,
$C_{(p)}$: carbon content (%) of base steel,
$C_{(w)}$: carbon content (%) of metal sheath of FCAW electrode,
$C_{(f)}$: carbon content (%) of core flux of FCAW electrode.

5. A method for arc welding carbon steel containing from 0.005 to 0.06% carbon, which comprises subjecting said steel to a plurality of welding passes at a welding speed of at least 30 cm/min, at least the first pass being made by nickel-bearing welding materials having a nickel content such that $Q_2$ in the following formula is at least 0.115% and the carbon content of the weld metal is less than 0.03%:

$$Q_2 = C_{(R)} + P_{(Ni)}/18.3, \text{ where } P_{(Ni)} = 0.42Ni_{(w)}$$

in which $C_{(R)}$: carbon content (%) of weld metal,
$P_{(Ni)}$: nickel parameter relating to nickel content, wherein $P_{(Ni)}$ is a positive value,
$Ni_{(w)}$: nickel content (%) of a member selected from the group consisting of GMAW solid wire and core wire of SMAW electrode.

6. A shielded metal arc welding process as claimed in claim 5, characterized by employing SMAW electrodes with a nickel content which satisfies the following formula:

$$0.32Ni_{(w)} + 0.14Ni_{(f)} \geq 2.3 - (13.8C_{(p)} + 11.3C_{(w)} + 2.26C_{(a)} + 0.015C_{(o)})$$

where $Ni_{(w)}$: nickel content (%) in core wire of SMAW electrode,
$Ni_{(f)}$: nickel content (%) in metallic powder of coating flux of SMAW electrode,
$C_{(p)}$: carbon content (%) of base steel,
$C_{(w)}$: carbon content (%) in core wire of SMAW electrode,
$C_{(a)}$: carbon content (%) in metallic powder of coating flux,
$C_{(o)}$: organic substance amount (%) in coating flux.

7. A gas metal arc welding process as claimed in claim 5, characterized by a welding speed faster than 50 cm/min and employing solid wire with a nickel content which satisfies the following formula:

$$0.42Ni_{(w)} \geq 1.74 - (9.52C_{(p)} + 6.77C_{(w)})$$

where
- $Ni_{(w)}$: nickel content (%) of solid wire,
- $C_{(p)}$: carbon content (%) of base steel,
- $C_{(w)}$: carbon content (%) of solid wire.

8. A gas metal arc welding process as claimed in claim 5, characterized by a welding speed faster than 40 cm/min and employing flux cored wires with a nickel content which satisfies the following formula:

$$0.55Ni_{(w)} \geq 2.0 - (8.0C_{(p)} + 7.8C_{(w)} + 9.9C_{(f)})$$

where
- $Ni_{(w)}$: nickel content (%) in core flux of FCAW electrode expressed as a % of the total weight of the electrode,
- $C_{(p)}$: carbon content (%) of base steel,
- $C_{(w)}$: carbon content (%) of metal sheath of FCAW electrode,
- $C_{(f)}$: carbon content (%) of core flux of FCAW electrode.

9. A method for arc welding nickel-bearing steel containing from 0.005 to 0.06% carbon, which comprises subjecting said steel to a plurality of welding passes at a welding speed of at least 30 cm/min, at least the first pass being made by nickel-bearing welding materials having a nickel content such that $Q_3$ in the following formula is at least 0.09% and the carbon content of the weld metal is at least 0.03%:

$$Q_3 = C_{(R)} + P_{(Ni)}/25, \text{ where}$$
$$P_{(Ni)} = 0.32Ni_{(w)} + 0.14Ni_{(f)} + 0.55Ni_{(p)}$$

in which
- $C_{(R)}$: carbon content (%) of weld metal,
- $P_{(Ni)}$: nickel parameter relating to nickel content, wherein $P_{(Ni)}$ is a positive value,
- $Ni_{(w)}$: nickel content (%) of a member selected from the group consisting of GMAW solid wire and core wire of SMAW electrode,
- $Ni_{(f)}$: nickel content (%) of coating flux of SMAW electrode,
- $Ni_{(p)}$: nickel content (%) of base steel.

10. A shielded metal arc welding process as claimed in claim 9, characterized by employing SMAW electrodes with a nickel content which satisfies the following formula:

$$0.55Ni_{(p)} + 0.32Ni_{(w)} + 0.14Ni_{(f)} \geq 2.3 - (13.8C_{(p)} + 11.3C_{(w)} + 2.26C_{(a)} + 0.015C_{(o)})$$

where
- $Ni_{(p)}$: nickel content (%) of base steel,
- $Ni_{(w)}$: nickel content (%) in core wire of SMAW electrode,
- $Ni_{(f)}$: nickel content (%) in metallic powder of coating flux of SMAW electrode,
- $C_{(p)}$: carbon content (%) of base steel,
- $C_{(w)}$: carbon content (%) in core wire in SMAW electrode,
- $C_{(a)}$: carbon content (%) in metallic powder of coating flux,
- $C_{(o)}$: organic substance amount (%) in coating flux.

11. A gas metal arc welding process as claimed in claim 9, characterized by a welding speed faster than 50 cm/min and employing solid wire with a nickel content which satisfies the following formula:

$$0.58Ni_{(p)} + 0.42Ni_{(w)} \geq 1.74 - (9.52C_{(p)} + 6.77C_{(w)})$$

where
- $Ni_{(p)}$: nickel content (%) of base steel,
- $Ni_{(w)}$: nickel content (%) of solid wire,
- $C_{(p)}$: carbon content (%) of base steel,
- $C_{(w)}$: carbon content (%) of solid wire.

12. A gas metal arc welding process as claimed in claim 9, characterized by a welding speed faster than 40 cm/min and employing flux cored wires with a nickel content which satisfies the following formula:

$$0.45Ni_{(p)} + 0.55Ni_{(w)} \geq 2.0 - (8.0C_{(p)} + 7.8C_{(w)} + 9.9C_{(f)})$$

where
- $Ni_{(p)}$: nickel content (%) of base steel,
- $Ni_{(w)}$: nickel content (%) in core flux of FCAW electrode expressed as a % of the total weight of the electrode,
- $C_{(p)}$: carbon content (%) of base steel,
- $C_{(w)}$: carbon content (%) of metal sheath of FCAW electrode,
- $C_{(f)}$: carbon content (%) of core flux of FCAW electrode.

13. A method for arc welding nickel-bearing steel containing from 0.005 to 0.06% carbon, which comprises subjecting steel to a plurality of welding passes at a welding speed of at least 30 cm/min, at least the first pass being made by nickel-bearing welding materials having a nickel content such that $Q_4$ in the following formula is at least 0.115% and the carbon content of the weld metal is less than 0.03%:

$$Q_4 = C_{(R)} + P_{(Ni)}/18.3, \text{ where}$$
$$P_{(Ni)} = 0.42Ni_{(w)} + 0.58Ni_{(p)}$$

in which
- $C_{(R)}$: carbon content (%) of weld metal,
- $P_{(Ni)}$: nickel parameter relating to nickel content, wherein $P_{(Ni)}$ is a positive value,
- $Ni_{(w)}$: nickel content (%) of a member selected from the group consisting of GMAW solid wire and core wire of SMAW electrode,
- $Ni_{(p)}$: nickel content (%) of base steel.

14. A shielded metal arc welding process as claimed in claim 13, characterized by employing SMAW electrodes with a nickel content which satisfies the following formula:

$$0.55Ni_{(p)} + 0.32Ni_{(w)} + 0.14Ni_{(f)} \geq 2.3 - (13.8C_{(p)} + 11.3C_{(w)} + 2.26C_{(a)} + 0.015C_{(o)})$$

where
- $Ni_{(p)}$: nickel content (%) of base steel,
- $Ni_{(w)}$: nickel content (%) in core wire of SMAW electrode,
- $Ni_{(f)}$: nickel content (%) in metallic powder of coating flux of SMAW electrode,
- $C_{(p)}$: carbon content (%) of base steel,
- $C_{(w)}$: carbon content (%) in core wire of SMAW electrode,
- $C_{(a)}$: carbon content (%) in metallic powder of coating flux,
- $C_{(o)}$: organic substance amount (%) in coating flux.

15. A gas metal arc welding process as claimed in claim 13, characterized by a welding speed faster than 50 cm/min and employing solid wire with a nickel content which satisfies the following formula:

$$0.58\text{Ni}_{(p)}+0.42\text{Ni}_{(w)}\geqq 1.74-(9.52\text{C}_{(p)}+6.77\text{C}_{(w)})$$

where
- $\text{Ni}_{(p)}$: nickel content (%) of base steel,
- $\text{Ni}_{(w)}$: nickel content (%) of solid wire,
- $\text{C}_{(p)}$: carbon content (%) of base steel,
- $\text{C}_{(w)}$: carbon content (%) of solid wire.

16. A gas metal arc welding process as claimed in claim 13, characterized by a welding speed faster than 40 cm/min and employing flux cored wires with a nickel content which satisfies the following formula:

$$0.45\text{Ni}_{(p)}+0.55\text{Ni}_{(w)}\geqq 2.0-(8.0\text{C}_{(p)}+7.8\text{C}_{(w)}+9.9\text{C}_{(f)})$$

where
- $\text{Ni}_{(p)}$: nickel content (%) of base steel,
- $\text{Ni}_{(w)}$: nickel content (%) in core flux of FCAW electrode expressed as a % of the total weight of the electrode,
- $\text{C}_{(p)}$: carbon content (%) of base steel,
- $\text{C}_{(w)}$: carbon content (%) of metal sheath of FCAW electrode,
- $\text{C}_{(f)}$: carbon content (%) of core flux of FCAW electrode.

* * * * *